United States Patent
Chen

(10) Patent No.: US 9,021,265 B1
(45) Date of Patent: Apr. 28, 2015

(54) ANONYMITY AUTHENTICATION METHOD FOR GLOBAL MOBILITY NETWORKS

(71) Applicant: National Chin-Yi University of Technology, Taichung (TW)

(72) Inventor: Chi-Tung Chen, Taichung (TW)

(73) Assignee: National Chin-Yi University of Technology, Taichung (TW)

( * ) Notice: Subject to any disclaimer, the term of this patent is extended or adjusted under 35 U.S.C. 154(b) by 0 days.

(21) Appl. No.: 14/273,542

(22) Filed: May 8, 2014

(30) Foreign Application Priority Data

Jan. 28, 2014 (TW) .............................. 103103232 A

(51) Int. Cl.
*H04L 29/06* (2006.01)
*H04L 9/08* (2006.01)
*H04L 9/32* (2006.01)

(52) U.S. Cl.
CPC .......... *H04L 63/0869* (2013.01); *H04L 9/0869* (2013.01); *H04L 9/0877* (2013.01); *H04L 9/3236* (2013.01); *H04L 63/0853* (2013.01); *H04L 2209/42* (2013.10)

(58) Field of Classification Search
USPC ........................................... 713/169
See application file for complete search history.

(56) References Cited

U.S. PATENT DOCUMENTS

| | | | |
|---|---|---|---|
| 6,981,145 B1 * | 12/2005 | Calvez et al. | 713/170 |
| 2006/0095290 A1 * | 5/2006 | Chernev | 705/1 |
| 2006/0095291 A1 * | 5/2006 | Cherney | 705/1 |
| 2007/0280481 A1 * | 12/2007 | Eastlake et al. | 380/277 |
| 2008/0275819 A1 * | 11/2008 | Rifai | 705/44 |

* cited by examiner

*Primary Examiner* — Kambiz Zand
*Assistant Examiner* — Aubrey Wyszynski
(74) *Attorney, Agent, or Firm* — CKC & Partners Co., Ltd.

(57) ABSTRACT

An anonymity authentication method for global mobility networks is provided. When a mobile user (MN) roams from an inner network to an outer network, a random number is introduced for participating an operation of the transmitted messages either in a registration procedure between the mobile user and a home agent (HA) or in a mutual verification procedure between the mobile user, the home agent, and a foreign agent (FA). Moreover, the operation of the transmitted messages uses only hash function and XOR operator. Therefore, the anonymity authentication method of the present disclosure has high efficiency, high security and low cost.

6 Claims, 3 Drawing Sheets

ANONYMITY AUTHENTICATION METHOD FOR GLOBAL MOBILITY NETWORKS

RELATED APPLICATIONS

The application claims priority to Taiwan Application Serial Number 103103232, filed on Jan. 28, 2014, which is herein incorporated by reference.

BACKGROUND

1. Technical Field

The present disclosure relates to an authentication method for global mobility networks, especially relates to an anonymity authentication method for global mobility networks.

2. Description of Related Art

With the technology development and increasing demands on the personal wireless communication, mobile communication devices such as smart phones are widely used. When a local mobile user roams to a foreign country, many issues may occur for switching from a local communication network to a foreign communication network. For example, a communication service for the local mobile user is normally provided by a local service provider, and a chip card (e.g. a SIM card) for the mobile user contains the account information from a home agent (HA) of the local service provider. When the local mobile user travels or moves to a foreign country, the service provider is changed. Therefore, if the mobile user still uses the same SIM card, there will be issues on switching between different service providers.

In this regard, roaming between different service providers with the same SIM card incurs a verification issue. In a verification procedure, messages transferred between a mobile user, a home agent and a foreign agent should be mutually verified. However, hackers will try any ways to obtain the messages during the verification procedure, which increases the risks on personal information or mobile phone number leakage for the mobile user.

Therefore, providing a secure authentication procedure is very important. Many authentication methods have been provided, but for achieving high security, their operating and transmitting procedures are very complicated, which causes high operational cost and low computational efficiency.

SUMMARY

According to one aspect of the present disclosure, an anonymity authentication method for global networks includes:

a registration procedure is performed for registering a mobile user to a home agent. The registration procedure includes:

a random number is chosen; an XOR operation is performed between the random number and a password chosen by the mobile user, and then a hash operation is performed for generating a first hash value; an user ID and the first hash value are transmitted to the home agent; string concatenation operations and hash operations are performed to the user ID, the first hash value, a private secret key for the home agent and a home agent ID for generating a first output value; a secret parameter set is issued to a smart card of the mobile user by the home agent, wherein the secret parameter set to includes the home agent ID, the first output value and a one-way hash value; and the random number is inputted to the smart card by the mobile user for generating another secret parameter set, wherein the another secret parameter set includes the home agent ID, the first output value, a one-way hash value and the random number; and a verification procedure is performed for mutually verifying the mobile user, the home agent and a foreign agent when the mobile user roaming to a foreign network managed by the foreign agent, the verification procedure includes: a user random factor is generated by the mobile user; XOR operation is performed to the first hash value and the first output value for generating a second output value; string concatenation operations and hash operations are performed to the user ID, the first hash value, the home agent ID, the foreign agent ID and the user random factor for generating a third output value; string concatenation operations and hash operations are performed to the second output value, the first hash value, the user ID, and the user random factor for generating a fourth output value; operations are performed to the user ID, the second output value, the foreign agent ID and the user random factor for generating a shadow ID; operations are performed to the first output value, the second output value and the user random factor for generating a first verification value; a login parameter set is transmitted to the foreign agent by the mobile user, wherein the login parameter includes the shadow ID, the third output value, the fourth output value, the first verification value, the home agent ID and the user random factor; a nonce is generated by the foreign agent, and performing string concatenation operations then hash operations to a common secret key pre-shared between the home agent and the foreign agent, the shadow ID, the third output value, the fourth output value, the first verification value, the foreign agent ID, the user random factor and the nonce for generating a second verification value; a parameter set is transmitted to the home agent by the foreign agent, wherein the parameter set includes the shadow ID, the third output value, the fourth output value, the first verification value, the foreign agent ID, the second verification value, the user random factor and the nonce of the foreign agent;

after receiving the parameter set transmitted from the foreign agent, the home agent assessing the foreign agent ID to determine whether the foreign agent is an ally;

if the home agent determines the foreign agent is an ally, then the following steps are performed: string concatenation operations then hash operations are performed to the common secret key, the shadow ID, the third output value, the fourth output value, the first verification value, the foreign agent ID, the user random factor and the nonce by the foreign agent for generating a third verification value, and comparing the third verification value with the second verification value;

if the third verification value is equal to the second verification value, the home agent authenticates the foreign agent, then string concatenation operations, XOR operations and bash operations are performed to the third output value, the home agent ID, the foreign agent ID, the user random factor and a private key selected by the home agent for generating a fifth output value; string concatenation operations then hash operations are performed to the fifth output value, the foreign agent ID and the user random factor, and then XOR operation is performed to the shadow ID for generating the user ID; string concatenation operations then hash operations are performed to the user ID, the fifth output value, the user random factor, and then XOR operation is performed to the fourth value for generating the first hash value; XOR operations are performed to the fifth output value and the first hash value for generating a sixth output value; string concatenation operations and hash operations are performed to the sixth output value, the fifth output value and the user random factor for generating a fourth verification value, and comparing the fourth verification value with the first verification value;

if the fourth verification value is equal to the first verification value, the home agent authenticates the mobile user, then string concatenation operations and hash operations are performed to the fifth output value, the sixth output value, the user ID, the foreign ID, the user random factor and the nonce by the foreign agent for generating a session key; string concatenation operations, hash operations and XOR operations are performed to the session key, the common secret key and the nonce by the foreign agent for generating a seventh output value; string concatenation operations and hash operations are performed to the fifth output value, the foreign agent ID and the user random factor for generating a fifth verification value; string concatenation operations and hash operations are performed to the common secret key, the seventh output value, the fifth verification value and the nonce for generating a sixth verification value; a parameter set is transmitted to the foreign agent by the home agent, wherein the parameter set includes the seventh output value, the fifth verification value and the sixth verification value;

after receiving the parameter set from the home agent, the foreign agent performs a verification procedure for verifying the home agent, the verification procedure includes: string concatenation operations and hash operations are performed to the common secret key, the seventh output value, the fifth verification value and the nonce by the foreign agent and generating a seventh verification value, and comparing the seventh verification value with the sixth verification value;

if the seventh verification value is equal to the sixth verification value, the foreign agent authenticates the home agent, then string concatenation operations and hash operations are performed to the common secret key and the nonce by the foreign agent, and then XOR operation is performed to the seventh output value for generating a session key; a parameter set is transmitted to the mobile user by the foreign agent, wherein the parameter set includes the fifth verification value, the foreign agent ID and the nonce by the foreign agent;

after receiving the parameter set, the mobile user performs a verification procedure for verifying the foreign agent, the verification procedure includes: string concatenation operations and hash operations are performed to the second output value, the foreign ID and the user random factor by the mobile user for generating an eighth verification value, and comparing the eighth verification value with the fifth verification value; and if the eighth verification value is equal to the fifth verification value, the mobile user authenticates the home agent, then string concatenation operations and hash operations are performed to the second output value, the first output value, the user ID, the foreign agent ID, the user random factor and the nonce by the foreign agent for generating a session key.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
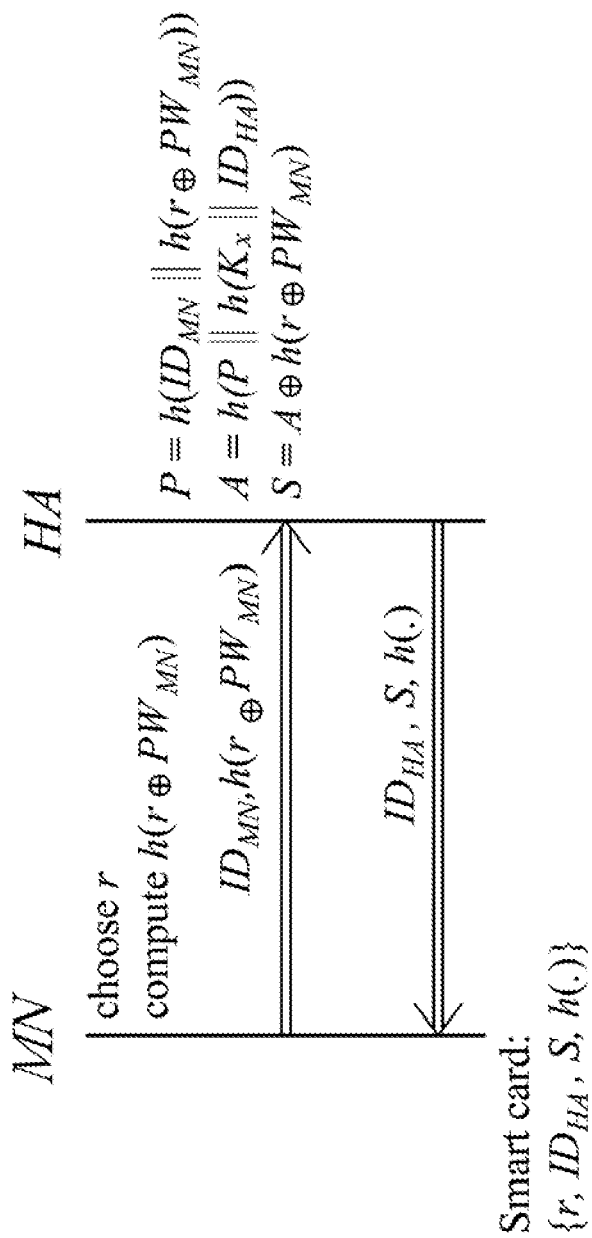
FIG. 1 is a schematic view showing a registration procedure of the anonymity authentication method for global mobility networks according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides an anonymity authentication method for global mobility networks. In a registration procedure between a mobile user and a home agent and a verification procedure between the mobile user, the home agent and a foreign agent, the transmitted messages are encrypted by random numbers, therefore high security is obtained. Furthermore, all operations are performed by combining simple hash function and XOR operator; therefore a high efficiency and effectiveness can be achieved.

FIG. 1 is a schematic view showing a registration procedure of the anonymity authentication method for global mobility networks according to one embodiment of the present disclosure. For clearly identifying the features of the application, the followed table shows corresponded definition of some terms in claim language.

| first hash value | $h(r \oplus PW_{MN})$ | fifth output value | $A = h(P\|h(Kx\|ID_{HA}))$ |
|---|---|---|---|
| first output value | $S = A \oplus h(r \oplus PW_{MN})$ | sixth output value | $S = A \oplus h(r \oplus PW_{MN})$ |
| one-way hash value | $h(.)$ | fourth verification value | $q_1^* = h(S\|A\|n_{MN})$ |
| second output value | $A = S \oplus h(r \oplus PW_{MN})$ | seventh output value | $M = SK \oplus h(K_{HF}\|n_{FA})$ |
| third output value | $T = P \oplus h(ID_{HA}\|ID_{FA}\|n_{MN})$ | fifth verification value | $q_2 = h(A\|ID_{FA}\|n_{MN})$ |
| fourth output value | $U = h(r \oplus P\ W_{MN}) \oplus h(ID_{MN}\|A\|n_{MN})$ | sixth verification value | $g_2 = h(K_{HF}\|M\|q_2)$ $n_{FA}$ |
| first verification value | $q_1 = h(S\|A\|n_{MN})$ | seventh verification value | $g_2^* = h(K_{HF}\|M\|q_2\|n_{FA})$ |
| second verification value | $g_1 = h(K_{HF}\|SID\|U\|T\|q_1\|ID_{FA}\|n_{MN}\|n_{FA})$ | eighth verification value | $q_2^* = h(A\|ID_{FA}\|n_{MN})$ |
| third verification value | $g_1^* = h(K_{HF}\|SID\|U\|T\|q_1\|ID_{FA}\|n_{MN}\|n_{FA})$ | | |

The registration procedure is for registering a mobile user (MN) to a home agent (HA), the registration procedure includes:

The MN freely selects a random number r.

At MN, computes $h(r \oplus PW_{MN})$, where $PW_{MN}$ is a password chosen by the mobile user, $h(.)$ is a hash value after operation and $\oplus$ is an XOR operator.

The mobile user transmits $ID_{MN}$ and $h(r \oplus PW_{MN})$ to the HA through a secret channel for performing the registration procedure, where $ID_{MN}$ is a user identity (user ID).

At HA, computes $P = h(ID_{MN}\|h(r \oplus PW_{MN}))$, $A = h(P\|h(Kx\|ID_{HA}))$, $S = A \oplus h(r \oplus PW_{MN})$, where $ID_{HA}$ is a home agent identity (home agent ID), $\|$ is a string concatenation operator, and Kx is a private secret key for the HA.

The HIA issues a secret parameter set $\{ID_{HA}, S, h(.)\}$ to a smart card of the MN.

The HA enters the random number r to the smart card, therefore, the smart card contains another secret parameter set $\{r, ID_{HA}, S, h(.)\}$.

After the aforementioned procedure, the registration procedure between the MN and the HA is finished. The MN roams to a foreign network managed by a foreign agent (FA) with the smart card, where the smart card contains the secret parameter set $\{r, ID_{HA}, S, h(.)\}$.

Figure 2A:
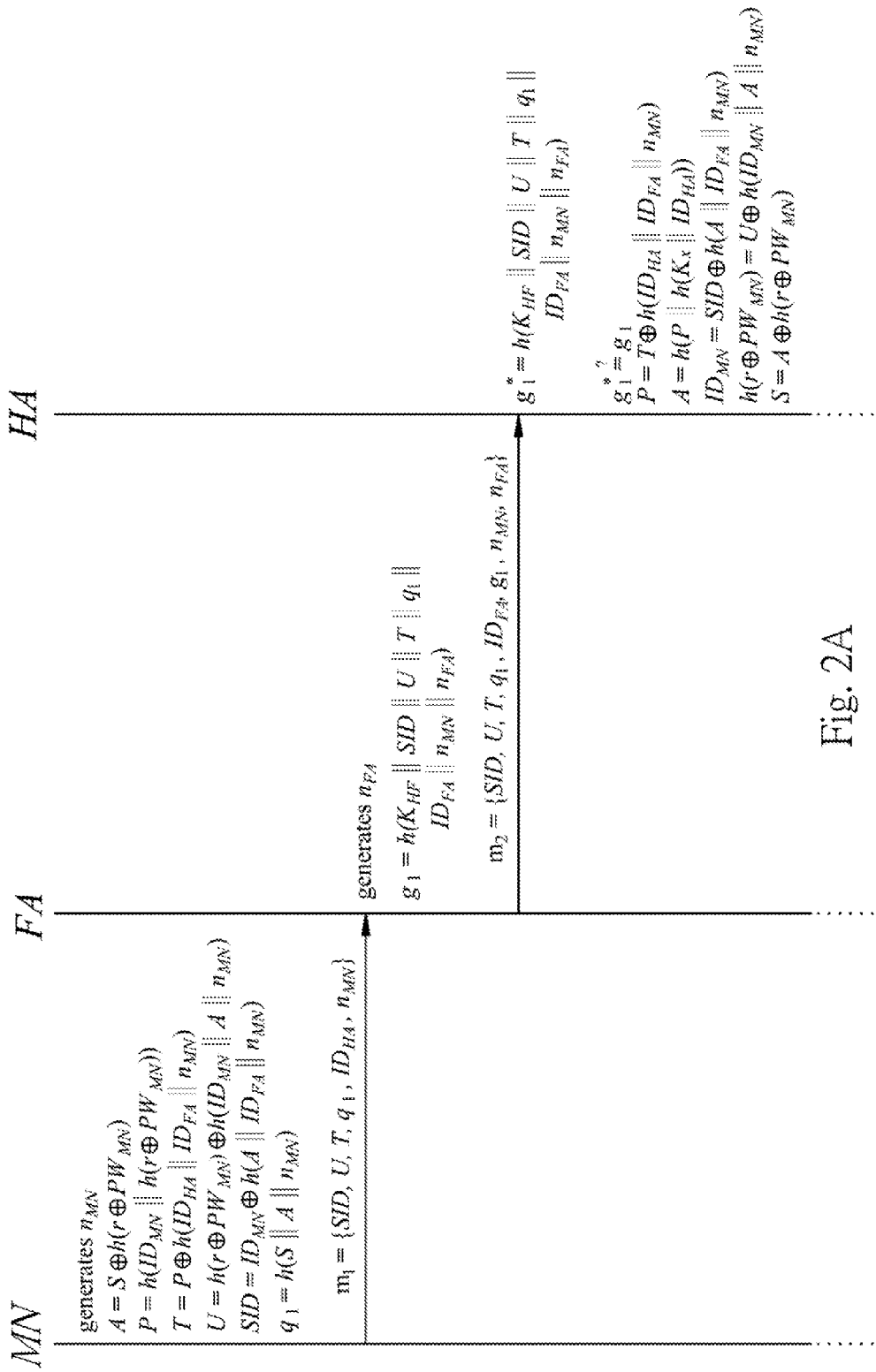
FIG. 2A is schematic view showing a verification procedure of the anonymity authentication method for global mobility networks according to one embodiment of the present disclosure.
Figure 2B:
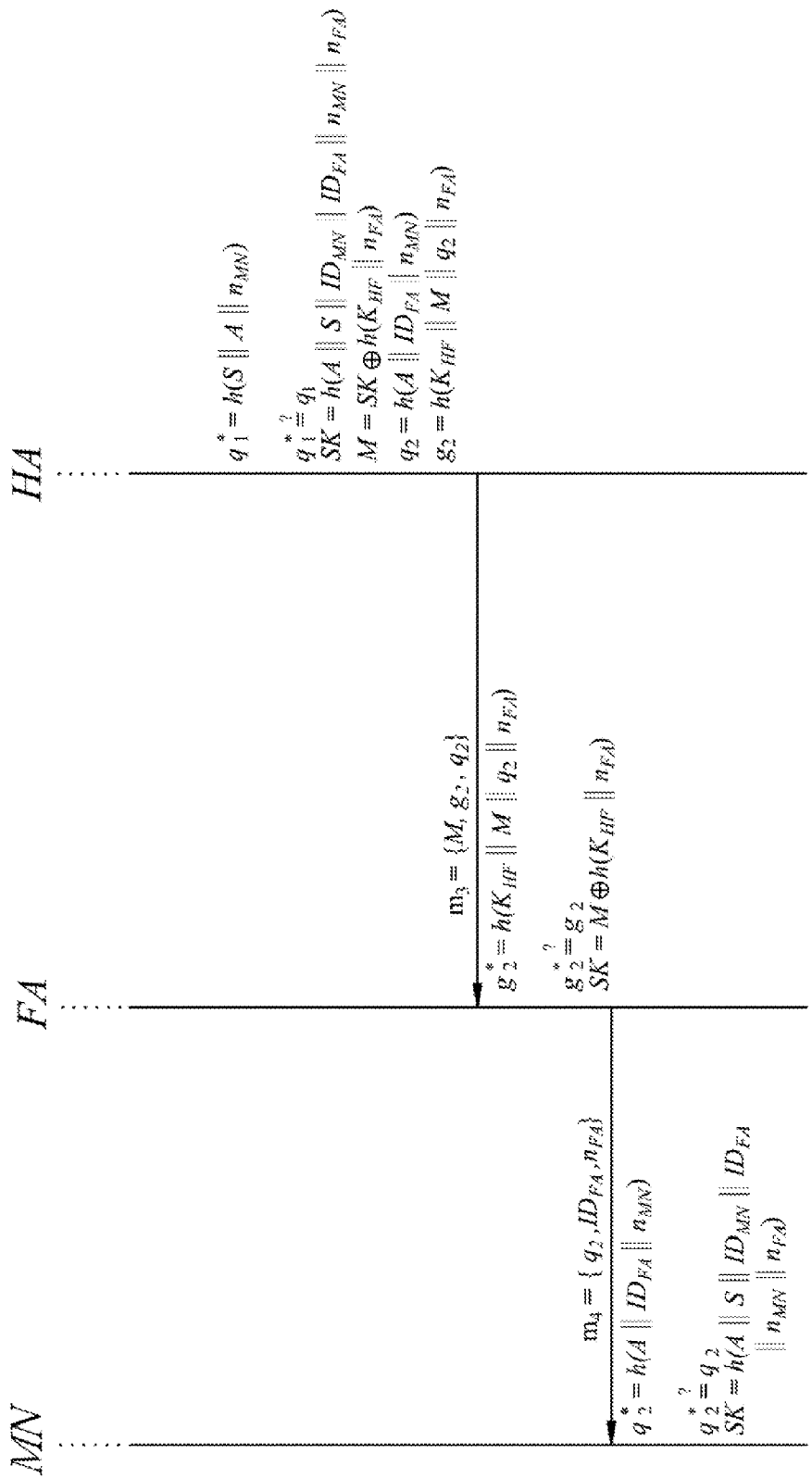
FIG. 2B is a schematic view showing a continued verification procedure of FIG. 2A.

FIG. 2A is schematic view showing a verification procedure of the anonymity authentication method for global mobility networks according to one embodiment of the present disclosure; and FIG. 2B is a schematic view showing a continued verification procedure of FIG. 2A.

The verification procedure is for preforming mutual verification between the MN, the HA and the FA. The verification procedure includes:

The MN enters a password $PW_{MN}$.

The MN generates a user random factor $n_{MN}$, then computes $A=S\oplus h(\oplus PW_{MN})$, $P=h(ID_{MN}\|h(r\oplus PW_{MN})$, $T=P\oplus h(ID_{HA}\|ID_{FA}\vee n_{MN})$, $U=h(r\oplus PW_{MN})\oplus h(ID_{MN}\|A\|n_{MN})$, $SID=ID_{MN}\oplus h(A\|ID_{FA}\|n_{MN})$ and $q_1=h(S\|A\|n_{MN})$, where SID is a shadow ID, $ID_{FA}$ is a foreign agent identity (foreign agent ID).

The MN transmits a login parameter set $m_1=\{SID, U, T, q_1, ID_{HA}, n_{MN}\}$ to the FA.

The FA generates a nonce $n_{FA}$, and computes $g_1=h(K_{HF}\|SID\|U\|T\|q_1\|ID_{FA}\|n_{MN}\|n_{FA})$, where $K_{HF}$ is a common secret key pre-shared between the HA and the FA.

The FA transmits a parameter set $m_2=\{SID, U, T, q_1, ID_{FA}, g_1, n_{MN}, n_{FA}\}$ to the HA.

After receiving the parameter set transmitted from the FA, the HA assesses the foreign agent ID to determine whether the FA is an ally;

If the HA determines the FA is an ally, then the FA computes $g_1^*=h(K_{HF}\|SID\|U\|T\|q_1\|ID_{FA}\|n_{MN}\|n_{FA})$, and compares $g_1^*$ with $g_1$.

If $g_1^*$ is equal to $g_1$, the HA authenticates the FA, and the HA computes $P=T\oplus h(ID_{HA}\|ID_{FA}\|n_{MN})$, $A=h(P\|h(Kx\|ID_{HA}))$ and $ID_{MN}=SID\oplus h(A\|ID_{FA}\|n_{MN})$.

The HA computes $h(r\oplus PW_{MN})=U\oplus h(ID_{MN}\|A\|n_{MN})$, $S=A\oplus h(r\oplus PW_{MN})$, and $q_1^*=h(S\|A\|n_{MN})$, and compares $q_1^*$ with $q_1$.

If $q_1^*$ is equal to $q_1$, then the HA authenticates the MN, and the HA computes $SK=h(A\|S\|ID_{MN}\|ID_{FA}\|n_{MN}\|n_{FA})$, where SK is session key.

The HA computes $M=SK\oplus h(K_{HF}\|n_{FA})$, $q_2=h(A\|ID_{FA}\|n_{MN})$ and $g_2=h(K_{HF}\|M\|q_2\|n_{FA})$.

The HA transmits a parameter set $m_3=\{M, g_2, q_2\}$ to the FA.

After receiving the parameter set $m_3$, the FA performs the following procedure for authenticating the HA.

The FA computes $g_2^*=h(K_{HF}\|M\|q_2\|n_{FA})$, and compares $g_2^*$ with $g_2$.

If $g_2^*$ is equal to $g_2$, the FA authenticates the HA, and the FA computes $SK=M\oplus h(K_{HF}\|n_{FA})$.

The FA transmits a parameter set $m_4=\{q_2, ID_{FA}, n_{FA}\}$ to the MN.

After receiving the parameter set $m_4$, the MN performs the following procedure for authenticating the HA, includes:

The MN computes $q_2^*=h(A\|ID_{FA}\|n_{MN})$, and compares $q_2^*$ with $q_2$.

If $q_2^*$ is equal to $q_2$, the MN authenticates the HA, and the HA computes $SK=h(A\|S\|ID_{MN}\|ID_{FA}\|n_{MN}\|n_{FA})$.

The anonymity authentication method for global mobility networks of the present disclosure can provide higher security than the conventional authentication method. In the following sections, the verification mechanisms between each member (MN, HA and FA) of the global mobility networks of the present disclosure are explained, and showing that the anonymity authentication method for global mobility networks of the present disclosure can overcome the disadvantages of the conventional authentication method and provide more protection to against the hacker's attack.

(a) Mutual Authentication and Session Key Establishment.

A Burrows-Abadi-Needham (BAN) logic method is widely used to prove the validity of authentication method and session key establishment. In general, when a MN roams in a foreign networks managed by the FA, the MN must performs mutual authentication with the FA through the HA. By a verification of the BAN logic method, the anonymity authentication method for global mobility networks of the present disclosure is proved to have good verification between the MN, the HA and the FA.

(b) Forgery Attacks and Relay Attacks.

A forgery attack occurs when an adversary impersonates the MN to deceive the FA or HA to gain access to their services. The anonymity authentication method of the present disclosure can effectively block the forgery attacks and the relay attacks.

(c) Two Factor Security.

When the smart card or the password of the MN is stolen, the security can be guaranteed using the anonymity authentication method for global mobility networks of the present disclosure.

(d) User Anonymity.

In the present disclosure, either in the MN or FA, the transmitted messages are encrypted with random numbers, thus anonymity authentication is achieved. The actions of the MN are untraceable by a hacker.

(e) Session Key Disclosure and Known-Key Security.

The anonymity authentication method for global mobility networks of the present disclosure can prevent session key disclosure and can ensure that compromised session keys cannot be used by an adversary to derive other session keys.

(f) Foreign Agent Spoofing.

The random number is utilized for generating the first hash value, and the private secret keys cannot be obtained by an adversary. Therefore, it is impossible for the adversary to spoof the FA, thus the personal login message of the MN is not available for the adversary.

(g) Insider Attacks, Stolen Verifier Attacks, and Verification Tables.

In the anonymity authentication method for mobility networks of the present disclosure, the FA and the HA don't need to maintain a verification table, therefore a stolen verifier attack can be prevented. The password of the MN is not directly used, and the password of the MN is used with the random number for generating the first hash value, thus the insider attacks can be blocked.

(h) Freely Chosen Password and Single Registration.

In the anonymity authentication method for mobility networks of the present disclosure, the MN selects a password freely. Furthermore, when the MN roams to a foreign networks, the FA can authenticate the MN through the HA. Therefore only a single registration procedure is required for the MN to register to the HA and acquire authentication from the FA.

Compared to the conventional authentication methods, the anonymity authentication method of the present disclosure not only has higher security, but also has higher computational efficiency and effectiveness. The following TABLE 1 and TABLE 2 demonstrate efficiency and effectiveness of the anonymity authentication method of the present disclosure. TABLE 1 shows efficiency of the anonymity authentication method of the present disclosure. Here efficiency can be divided into computational cost and communication cost.

In the anonymity authentication method of the present disclosure, two procedures are involved, the registration procedure and the verification procedure (including verification steps and session key establishment). The demonstration of efficiency is mainly focused on the verification procedure.

In TABLE 1, computational cost and communication cost of each step on the verification procedure are showed, and the influence on package loss and interferences are ignored. In a conventional verification procedure, in addition to XOR operator and one-way hash function (hereinafter Hash), a symmetry encrypt/decrypt operation thereinafter Sym) or an asymmetry encrypt/decrypt operation (hereinafter Asym) is also used. For example, in a conventional case, when transmitting messages, the MN, the FA and the HA utilize 4Hash+ 3XOR+2Sym, 4Hash+1XOR+2Sym+2Asym and 5Hash+ 3XOR+1Sym+2Asym respectively. In the verification procedure of the present disclosure, the MN, the FA and the HA utilize 7Hash+5XOR, 3Hash+1XOR and 10Hash+ 5XOR respectively. Commonly the computational cost for the XOR operation is very low, and the computational cost for the symmetry encrypt/decrypt operation or the asymmetry encrypt/decrypt operation is much higher. In the verification procedure of the present disclosure, only simple XOR operation and Hash function are utilized, thus the computational cost is much lower.

Furthermore, a time complexity of the hash function is O(1), therefore, the anonymity authentication method of the present disclosure is very simple and less time complexity.

Concerning to the communication cost, as showed in TABLE 1, only two communication rounds and four message transmitting rounds are used in the anonymity authentication method of the present disclosure. Therefore, the anonymity authentication method for global mobility networks of the present disclosure has high efficiency.

TABLE 1

| Computational cost | |
|---|---|
| MN | 7Hash + 5XOR |
| FA | 3Hash + 1XOR |
| HA | 10Hash + 5XOR |
| SUM | 20Hash + 11XOR |
| Time complexity | O(1) |
| Communication cost | |
| Communication rounds | 2 |
| Transmitted messages | 4 |

TABLE 2

| The anonymity authentication method of the present disclosure | |
|---|---|
| Energy consumption | Low |
| User anonymity | Yes |
| No verification/password table | Yes |
| Mutual authenticaton | Yes |
| Session key establishment | Yes |
| Session key disclosure resistance | Yes |
| Forgery attack resistance | Yes |
| No synchronized time mechanism | Yes |
| Freely chosen password | Yes |
| Insider attack resistance | Yes |
| Foreign agent spoofing resistance | Yes |

TABLE 2 shows effectiveness of the verification procedure of the present disclosure.

The anonymity authentication method of the present disclosure also provides the features that: The MN can freely select a password $PW_{MN}$ without the assistance of the HA in the registering procedure. When the MN roams to the foreign networks managed by a registered FA, the FA can authenticate the MN through the HA of the MN. In order to perform a verification procedure in global mobility networks, only one registration procedure should be performed between the MN and the HA.

In conclusion, the anonymity authentication method of the present disclosure has advantages on freely selected password of the MN, single registration procedure, mutual authentication, secret key establishment, low computational and communication cost, and no requirement on verification table. Moreover, there is no time synchronization issue because the anonymity authentication method of the present disclosure is random number-based and without utilizing a time stamp. In the anonymity authentication method of the present disclosure, each FA and each HA share a unique secret key, and it is able to prevent personal message disclosure when the system is attacked by the hackers. In an application, the anonymity authentication method of the present disclosure has much functionality. By verifying of a BAN logic method, the anonymity authentication method of the present disclosure is proved to have good verification between the MN, the HA and the FA and effective key establishment procedure. Therefore, the anonymity authentication method of the present disclosure has higher security and better effectiveness than the conventional authentication method.

Moreover, the authentication method of the present disclosure has lower computational cost, shorter computational time, fewer communication rounds, fewer transmitted messages, and less energy consumption.

The anonymity authentication method of the present disclosure can block various kinds of attacks and provide higher security during message transmission. Therefore, the anonymity authentication method of the present disclosure has high security, high efficiency and high effectiveness.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An anonymity authentication method for global mobility networks, comprising:
    a registration procedure for registering a mobile user to a home agent, the registration procedure comprising:
        choosing a random number;
        performing an XOR operation between the random number and a password chosen by the mobile user, and then performing a hash operation for generating a first hash value;
        transmitting an user ID and the first hash value to the home agent;
        performing string concatenation operations and hash operations to the user ID, the first hash value, a private secret key for the home agent and a home agent ID for generating a first output value;
        issuing a secret parameter set to a smart card of the mobile user by the home agent, wherein the secret parameter set comprises the home agent ID, the first output value and a one-way hash value; and
        inputting the random number to the smart card by the mobile user for generating another secret parameter set, wherein the another secret parameter set comprises the home agent ID, the first output value, a one-way hash value and the random number; and
    performing a verification procedure for mutually verifying the mobile user, the home agent and a foreign agent when the mobile user roaming to a foreign network managed by the foreign agent, the verification procedure comprising:
generating a user random factor by the mobile user;
performing XOR operation to the first hash value and the first output value for generating a second output value; performing string concatenation operations and hash operations to the user ID, the first hash value, the home agent ID, the foreign agent ID and the user random factor for generating a third output value; performing string concatenation operations and hash operations to the second output value, the first hash value, the user ID, and the user random factor for generating a fourth output value; performing operations to the user ID, the second output value, the foreign agent ID and the user random factor for generating a shadow ID; performing operations to the first output value, the second output value and the user random factor for generating a first verification value;
transmitting a login parameter set to the foreign agent by the mobile user, wherein the login parameter set comprises the shadow ID, the third output value, the fourth output value, the first verification value, the home agent ID and the user random factor;
generating a nonce by the foreign agent, and performing string concatenation operations then hash operations to a common secret key pre-shared between the home agent and the foreign agent, the shadow ID, the third output value, the fourth output value, the first verification value, the foreign agent ID, the user random factor and the nonce by the foreign agent for generating a second verification value;
transmitting a parameter set to the home agent by the foreign agent, wherein the parameter set comprises the shadow ID, the third output value, the fourth output value, the first verification value, the foreign agent ID, the second verification value, the user random factor and the nonce by the foreign agent;
after receiving the parameter set transmitted from the foreign agent, the home agent assessing the foreign agent ID to determine whether the foreign agent is an ally; and
if the home agent determines the foreign agent is an ally, then performing the steps of:
performing string concatenation operations then hash operations to the common secret key, the shadow ID, the third output value, the fourth output value, the first verification value, the foreign agent ID, the user random factor and the nonce by the foreign agent for generating a third verification value, and comparing the third verification value with the second verification value;
if the third verification value is equal to the second verification value, the home agent authenticates the foreign agent, then performing string concatenation operations, XOR operations and hash operations to the third output value, the home agent ID, the foreign agent ID, the user random factor and a private key selected by the home agent for generating a fifth output value; performing string concatenation operations then hash operations to the fifth output value, the foreign agent ID and the user random factor, and then performing XOR operation to the shadow ID for generating the user ID; performing string concatenation operations then hash operations to the user ID, the fifth output value, the user random factor, and then performing XOR operation to the fourth value for generating the first hash value; performing XOR operations to the fifth output value and the first hash value for generating a sixth output value; performing string concatenation operations and hash operations to the sixth output value, the fifth output value and the user random factor for generating a fourth verification value, and comparing the fourth verification value with the first verification value;
if the fourth verification value is equal to the first verification value, the home agent authenticates the mobile user, then preforming string concatenation operations and hash operations to the fifth output value, the sixth output value, the user ID, the foreign agent ID, the user random factor and the nonce by the foreign agent for generating a session key;
performing string concatenation operations, hash operations and XOR operations to the session key, the common secret key and the nonce by the foreign agent for generating a seventh output value; performing string concatenation operations and hash operations to the fifth output value, the foreign agent ID and the user random factor for generating a fifth verification value; performing string concatenation operations and hash operations to the common secret key, the seventh output value, the fifth verification value and the nonce by the foreign agent for generating a sixth verification value;
transmitting a parameter set to the foreign agent by the home agent, wherein the parameter set comprises the seventh output value, the fifth verification value and the sixth verification value;
after receiving the parameter set from the home agent, the foreign agent performing a foreign verification procedure for verifying the home agent, the foreign verification procedure comprising:
performing string concatenation operations and hash operations to the common secret key, the seventh output value, the fifth verification value and the nonce by the foreign agent and generating a seventh verification value, and comparing the seventh verification value with the sixth verification value;
if the seventh verification value is equal to the sixth verification value, the foreign agent authenticates the home agent, then performing string concatenation operations and hash operations to the common secret key and the nonce by the foreign agent, and then performing XOR operation to the seventh output value for generating a session key; and
transmitting a parameter set to the mobile user by the foreign agent, wherein the parameter set comprises the fifth verification value, the foreign agent ID and the nonce by the foreign agent; and
after receiving the parameter set, the mobile user performing a home verification procedure for verifying the home agent, the home verification procedure comprising:
performing string concatenation operations and hash operations to the second output value, the foreign ID and the user random factor by the mobile user for generating an eighth verification value, and comparing the eighth verification value with the fifth verification value; and
if the eighth verification value is equal to the fifth verification value, the mobile user authenticates the home agent, then preforming string concatenation operations and hash operations to the second output value, the first output value, the user ID, the foreign agent ID, the user random factor and the nonce by the foreign agent for generating a session key.

2. The anonymity authentication method of claim 1, wherein the home agent transmits the secret parameter set to the mobile user through a secret channel.

3. The anonymity authentication method of claim 1, wherein the mobile user transmits the user ID to the home agent for registering through a secret channel.

4. The anonymity authentication method of claim 1, wherein the home agent is a computer with storage functionality.

5. The anonymity authentication method of claim 1, wherein the foreign agent is a computer with storage functionality.

6. The anonymity authentication method of claim 1, wherein the smart card is a SIM card.

* * * * *